United States Patent [19]

Kumar et al.

[11] Patent Number: 5,134,035
[45] Date of Patent: Jul. 28, 1992

[54] MAGNETIC RECORDING MEDIUM CONTAINING A POLYURETHANE COPOLYMER WITH A FREE RADICALLY POLYMERIZED POLYMER SEGMENT GRAFTED TO THE POLYURETHANE THROUGH A SULFUR ATOM

[75] Inventors: Ramesh C. Kumar; James G. Carlson; Jeffrey T. Anderson, all of St. Paul, Minn.

[73] Assignee: Minnesota Mining and Manufacturing Company, St. Paul, Minn.

[21] Appl. No.: 543,230

[22] Filed: Jun. 25, 1990

[51] Int. Cl.$^5$ .............................................. G11B 5/00
[52] U.S. Cl. ................................ 428/425.9; 428/694; 428/900; 252/62.54
[58] Field of Search ...................... 428/694, 900, 425.9; 252/62.54

[56] References Cited

U.S. PATENT DOCUMENTS

| | | | |
|---|---|---|---|
| 3,787,303 | 1/1974 | Guthrie et al. | 204/159.15 |
| 4,521,546 | 6/1985 | O'Connor et al. | 521/137 |
| 4,647,506 | 3/1987 | Colon et al. | 428/413 |
| 4,672,095 | 6/1987 | Ito et al. | 525/455 |
| 4,683,280 | 7/1987 | Ukachi et al. | 528/71 |
| 4,837,082 | 6/1989 | Harrell et al. | 428/329 |

FOREIGN PATENT DOCUMENTS 0311935 4/1989 European Pat. Off. .

OTHER PUBLICATIONS

Chemical Abstract No. 90-041398106 of Japanese Patent No. 01319122, Dec. 25, 1989.
Chemical Abstract for Japanese Patent No. 01282726, Nov. 14, 1989.
Jones et al., *Journal of Inorganic and Nuclear Chemistry*, 40, 1235 (1978).
Chujo et al., *Polymer Bulletin*, 8, 239 (1982).
Pappas, J. Rad. Cur., Jul. 1987, p. 6.
Chapters 20 and 21, Macromolecules, vol. 2, 2nd Ed., H. G. Elias, Plenum Press, 1984.

*Primary Examiner*—Paul J. Thibodeau
*Assistant Examiner*—Stevan A. Resan
*Attorney, Agent, or Firm*—Gary L. Griswold; Walter N. Kirn; Janice L. Dowdall

[57] ABSTRACT

The invention relates to a sulfonated, thiol, and hydroxy-functional polyurethane polymer which comprises: (i) a polyurethane backbone; (ii) at least one $SO_3M$ group pendant from the polyurethane backbone, wherein the polyurethane backbone has an $SO_3M$ equivalent weight of from about 2,000 to about 100,000, and wherein M is selected from the group consisting of $H^+$, $NR_4^+$ wherein R can be $H^+$ or an alkyl group, $Li^+$, $Na^+$, $K^+$, and mixtures thereof; (iii) at least two crosslinkable hydroxy groups pendant from the polyurethane backbone, wherein the polyurethane backbone has a hydroxy equivalent weight of from about 500 to about 50,000; and (iv) at least one —SH group pendant from the polyurethane backbone. The invention also relates to vinyl/polyurethane copolymers made therewith which are particularly useful as binders in magnetic recording media and a method of making the copolymers. The invention also relates to certain nonsulfonated thiol and hydroxy functional polyurethane graft copolymers and dispersions made therewith.

6 Claims, No Drawings 5,134,035

MAGNETIC RECORDING MEDIUM CONTAINING A POLYURETHANE COPOLYMER WITH A FREE RADICALLY POLYMERIZED POLYMER SEGMENT GRAFTED TO THE POLYURETHANE THROUGH A SULFUR ATOM

FIELD OF THE INVENTION

This invention relates to sulfonated and non-sulfonated, thiol, and hydroxy-functional polyurethanes and vinyl/sulfonated and non-sulfonated, hydroxy-functional polyurethane graft copolymers made therewith. The invention also relates to the use of the copolymers in magnetic recording media.

BACKGROUND OF THE INVENTION

Magnetic recording media generally include a binder dispersion layer comprising a binder and a pigment overlying a substrate, wherein the pigment is dispersed within the binder. Typically, the pigment is a magnetizable pigment comprising small, magnetizable particles. In some instances, the medium may be in the form of a composite having both back-coat and front-coat binder dispersion layers, although the pigment in the back-coat may or may not be a magnetizable pigment.

It has become desirable to have as high a loading of magnetizable pigment in the magnetic recording media as is reasonably possible. It is often preferred to have a binder dispersion comprising from about 70% to 85% by weight magnetizable pigment relative to the binder with as many magnetizable particles per unit area or unit volume as possible. It is also preferred to have a binder dispersion in which the magnetizable pigment comprises a plurality of small particles having a relatively high specific surface area. Higher pigment loading has the potential to provide high density magnetic recording media capable of storing more information.

Problems, however, remain in the art concerning magnetic recording media having a relatively high loading of magnetizable pigment. To begin with, magnetizable pigments tend to agglomerate, and they are difficult to properly and fully disperse within the binder. Wetting agents, or dispersants, are often employed to facilitate such dispersion. For higher pigment loading, i.e., the use of greater amounts by weight and number of magnetizable particles, greater amounts of such dispersants are required, which is not always desirable. There are a number of reasons for using as little dispersant as possible. Costs, for example, can be reduced by using less dispersant. Additionally, binder dispersions can be more readily and reproducibly prepared when less dispersant is used. Further, excess dispersant may have a tendency to bloom from a cured binder dispersion over time, leading to contamination of a recording head or the like, or causing a change in the physical or chemical characteristics of the media.

Another problem in the art is that the viscosity of a binder dispersion generally increases with higher loading of magnetizable pigment. If the dispersion is too viscous, it can be difficult to apply to the substrate, and good magnetic orientation of the pigment, i.e., a squareness ratio of 0.75 or more, can be hard to obtain. The squareness ratio (Br/Bm), which is the ratio of the remnant saturation induction, or residual magnetization (Br), to the saturation induction, or saturation magnetization (Bm), refers to the effectiveness of the orientation of the magnetic particles. For randomly-oriented particles, the squareness ratio is 0.5 and for ideally and perfectly oriented particles, the ratio is equal to 1.0. Values for the squareness ratio, of media exhibiting good performance, normally fall around 0.75 to 0.85, with higher values being significantly better. In general, an increase in the squareness ratio is reflected by an improvement in orientation characteristics and electromagnetic properties and an increase from 0.75 to 0.80 (i.e. an increase of 0.05) results in a significant advantage. The difference between a 0.75 and a 0.85 squareness ratio typically represents about a 1 decibel improvement in electromagnetic characteristics, which is manifested by an approximate 10% improvement in electromagnetic properties such as signal output and/or signal-to-noise ratio.

To help alleviate these problems with high pigment loading, binder compositions having internal dispersants have been developed. Such compositions comprise polymers with functional moieties pendant from the polymer backbone that help disperse the magnetizable pigment. As a result of using these compositions, less dispersant is needed for dispersion of magnetizable pigment in the binder.

Copending U.S. application Ser. No. 07/429,720, filed Oct. 31, 1989 now U.S. Pat. No. 5,071,578, which is a continuation-in-part of U.S. application No. 07/295,046, filed Jan. 6, 1989 (assigned to the assignee of the present case) discloses a curable polymer having internal dispersants which comprises a sulfonated, hydroxy-functional polyurethane (SHPU) resin. The SHPU resin can be used as part of a binder layer in magnetic recording media. The application discloses the excellent dispersion of magnetizable pigment within the SHPU resin and the ease of application of the dispersion onto a suitable substrate.

There are, however, certain types of media constructions where high glass transition temperature (Tg) and abrasion resistance in the uncured state, and high final coating modulus are both desirable and necessary, for example, where stiffer tapes are needed for better handling in the recording and playback machine, or where manufacturing methods dictate the necessity of having high initial strength coatings that are resistant to damage during manufacture or processing.

In order to increase the durability, running properties, and reliability of the magnetic recording media, attempts have been made to add a hard material to the pigment-containing binder.

U.S. application Ser. No. 07/315,304, now abandoned filed Mar. 1, 1989 (assigned to the assignee of the present case) discloses a curable magnetic binder composition which comprise a curable sulfonated hydroxy functional polyurethane blended with another polymer, usually called a "hard resin" to attain the desired high Tg for optimum binder performance in certain applications. The "hard resin" disclosed in U.S. application Ser. No. 07/315,304 is a cross-likable hydroxy functional vinyl chloride having incorporated therein $SO_3M$ groups wherein M represents H or a metal cation. Although polymer blends of the type disclosed in U.S. application Ser. No. 07/315,304 are very useful, the dispersing character of the binder system can sometimes diminish. In addition, only a few types of hard resins have been found to be functional because of a general lack of polymer/polymer compatibility. For example, hard resins based upon acrylic monomers have not been found to be usefully compatible with the preferred types of polyurethane binder resins.

In order to optimize binder performance, single polymer systems have been developed in which a "hard resin" is grafted onto a polyurethane having pendant therewith.

Copending, concurrently filed U.S. patent application Ser. No. 07/543,361, Kumar et al., (assigned to the assignee of the present case) discloses vinyl/SHPU and vinyl/HPU copolymers made via photoiniferter technology using novel sulfonated, hydroxy and carbamate functional polyurethane macroiniferters and novel hydroxy and carbamate functional macroiniferters, respectively. The method generates quality material which performs very well when tested in magnetic recording applications. However, due to the photopolymerization required, the acquisition of special manufacturing equipment is necessary.

Copending, concurrently filed U.S. patent application Ser. No. 07,543,343, Carlson et al., (assigned to the assignee of the present case) discloses vinyl/SHPU and vinyl/HPU copolymers made via the utilization of macromonomer diols. The method generates quality material, however, it is limited as to the selection of monomers that can be polymerized (i.e., non-hydroxy functional monomers).

Thus, somewhat similar copolymers can be prepared via the above two methods although each method and resultant copolymer has its own distinct advantages.

Although the above two methods and respective copolymers are extremely useful, a need exists for a single polymer magnetic binder system which does not need to be blended with a hard resin which possesses a high $T_g$, which possesses good mechanical properties, which disperses pigment well, which is capable of being crosslinked by isocyanate curatives, which does not require the installation of special manufacturing equipment and which is useful in polymerizing a wide selection of monomers. We have discovered such a method and copolymer.

BRIEF DESCRIPTION OF THE INVENTION

A first aspect of the present invention relates to a novel sulfonated, thiol and hydroxy-functional polyurethane. The novel polyurethane can be used in making novel vinyl/sulfonated and hydroxy functional polyurethane (vinyl/SHPU) graft copolymers.

A second aspect of the present invention relates to the novel vinyl/polyurethane graft copolymers made using the novel sulfonated, thiol and hydroxy-functional polyurethane.

A third aspect of the invention relates to novel vinyl/hydroxy functional polyurethane graft copolymers (vinyl/HPU).

A fourth aspect of the present invention relates to a dispersion for use in magnetic recording media. The dispersion comprises a binder composition comprising one of the graft copolymers described above. A magnetizable pigment is dispersed in the composition.

A fifth aspect of the present invention relates to a composite for magnetic recording. The composite includes a substrate having a front side and a back side. A cured dispersion comprising one of the above described copolymers is coated on at least one side of the substrate. A magnetizable pigment is dispersed in the cured dispersion.

A sixth aspect of the present invention relates to a method of making the graft copolymers.

The novel vinyl/SHPU copolymers of the present invention overcome the difficulties of known binders used in magnetic recording media in that a substantial portion of the hard resin is grafted onto the sulfonated hydroxy functional polyurethane rather than mixed therewith which produces very good compatibility in terms of mechanical properties and optical clarity. These copolymers disperse magnetic pigment as well as sulfonated hydroxy-functional polyurethane itself.

The novel vinyl/HPU copolymers also overcome the difficulties of known binders in that a substantial portion of the hard resin is pendant from the hydroxy functional polyurethane rather than mixed therewith which produces good compatibility. These polymers are typically combined with a dispersant in order to provide a dispersion useful in magnetic recording media.

Moreover, both copolymers possess glass transition temperatures which are higher than the glass transition temperatures of the sulfonated hydroxy functional polyurethane thus resulting in highly durable materials.

The invention provides a sulfonated, thiol, and hydroxy-functional polyurethane polymer which comprises:
(i) a polyurethane backbone;
(ii) at least one $SO_3M$ group pendant from the polyurethane backbone, wherein the polyurethane backbone has an $SO_3M$ equivalent weight of from about 2,000 to about 100,000, and wherein M is selected from the group consisting of $H^+$, $NR_4^+$ wherein R can be H or an alkyl group, $Li^+$, $Na^+$, $K^+$, and mixtures thereof;
(iii) at least two crosslinkable hydroxy groups pendant from the polyurethane backbone, wherein the polyurethane backbone has a hydroxy equivalent weight of from about 500 to about 50,000; and
(iv) at least one —SH group pendant from the polyurethane backbone.

The invention also provides a graft copolymer comprising:
(i) a polyurethane backbone;
(ii) at least one $SO_3M$ group pendant from the polyurethane backbone, wherein the polyurethane backbone has an $SO_3M$ equivalent weight of from about 2,000 to about 100,000, and wherein M is selected from the group consisting of $H^+$, $NR_4^+$ wherein R can be $H^+$ or an alkyl group, $Li^+$, $Na^+$, $K^+$, and mixtures thereof;
(iii) at least two crosslinkable hydroxy groups pendant from the polyurethane backbone, wherein the polyurethane backbone has a hydroxy equivalent weight of from about 500 to about 50,000; and
(iv) at least one monovalent moiety of the formula —S—B pendant from the polyurethane backbone wherein
B represents a polymer segment comprising polymerized free radically polymerizable monomer, wherein the weight ratio of the polyurethane backbone and $SO_3M$, OH, and S to the polymer segment(s) B ranges from about 95 to about 95:5.

The invention also provides a graft copolymer comprising:
(i) a polyurethane backbone;
(ii) at least three crosslinkable hydroxy groups pendant from the polyurethane backbone, wherein the polyurethane backbone has a hydroxy equivalent weight of from about 500 to about 50,000; and
(iii) at least one monovalent moiety of the formula —S—B pendant from the polyurethane backbone wherein B represents a polymer segment comprising polymerized free radically polymerizable monomer, wherein the weight ratio of the polyurethane backbone, OH, and S to the polymer segment(s) B ranges from about 5:95 to about 95:5.

The invention also provides a dispersion for use in magnetic recording media comprising:
(a) a graft copolymer comprising:
   (i) a polyurethane backbone;
   (ii) two crosslinkable hydroxy groups pendant from the polyurethane backbone, wherein each hydroxy group is pendant from an opposite end of the polyurethane backbone, and wherein the polyurethane backbone has a hydroxy equivalent weight of from about 2500 to about 50,000; and
   (iii) at least one monovalent moiety of the formula —S—B pendant from the polyurethane backbone wherein
      B represents a polymer segment comprising polymerized free radically polymerizable monomer, wherein the weight ratio of the polyurethane backbone, OH, and S to the polymer segment(s) B ranges from about 5:95 to about 95:5; and
(b) a dispersing agent; and
(c) a magnetizable pigment dispersed in the copolymer.

The invention also provides a method of making a copolymer which comprises the steps of:
(a) mixing a (1) sulfonated, thiol, and hydroxy-functional polyurethane polymer which comprises:
   (i) a polyurethane backbone;
   (ii) at least one SO$_3$M group pendant from the polyurethane backbone, wherein the polyurethane backbone has an SO$_3$M equivalent weight of from about 2,000 to about 100,000, and wherein M is selected from the group consisting of H$^+$, NR$_4^+$ wherein R can be H$^+$ or an alkyl group, Li$^+$, Na$^+$, K$^+$, and mixtures thereof;
   (iii) at least two crosslinkable hydroxy groups pendant from the polyurethane backbone, wherein the polyurethane backbone has a hydroxy equivalent weight of from about 500 to about 50,000; and
   (iv) at least one —SH group pendant from the polyurethane backbone; (2) a monomer charge comprising free radically polymerizable monomer capable of being polymerized in order to form one or more polymeric segments B, wherein the weight ratio of the sulfonated, thiol and hydroxy-functional polyurethane polymer to the free radically polymerizable monomer ranges from about 5:95 to about 95:5; (3) sufficient solvent, if needed, in order to facilitate polymerization; and (4) an effective amount of an initiator capable of forming free radicals upon being subjected to a means of initiation wherein the free radicals are capable of abstracting the —SH hydrogen atoms of the sulfonated thiol and hydroxy-functional polyurethane in order to form sulfonated thiol and hydroxy-functional free radicals, wherein the sulfonated, thiol and hydroxy-functional free radicals are capable of initiating free radical polymerization of the free radically polymerizable monomer in order to form one or more polymeric segments B;
(b) initiating free radical polymerization; and
(c) sustaining said free-radical polymerization until the copolymer is produced.

DETAILED DESCRIPTION OF THE INVENTION

I. Sulfonated, Thiol and Hydroxy-Functional Polyurethane Copolymer and Preparation Thereof The first step in the preparation of the sulfonated, thiol and hydroxy-functional polyurethane copolymer is the synthesis of a sulfonated, thiol and hydroxy functional polyurethane.

I(a). Sulfonated, Thiol and Hydroxy-Functional Polyurethane Polymer

I(a)(i). Polyurethane Polymer Backbone

The polyurethane polymer backbone of the sulfonated, thiol and hydroxy-functional polyurethane polymer is similar to the polyurethane polymer backbone of the polymer described in U.S. patent application Ser. No. 07/429,720 (assigned to the assignee of the present case) which is a continuation-in-part of Ser. No. 07/295,046, both incorporated by reference herein. The polyurethane backbone may be viewed as comprising a plurality of segments, each segment being a structural fragment resulting from the reaction of a polyol with a polyisocyanate. According to the present invention, one or more polyhydroxy compounds may be used together with other hydroxy compounds having no sulfonate groups such as polyester polyols, polyether polyols, polycarbonate polyols, and the like. Hydroxyl compounds containing thiol functionality are included and the polymerization conditions are arranged so as to leave the thiol groups unreacted with the polyisocyanate. The individual segments of the backbone can be viewed as being soluble (hydrophobic) or insoluble (hydrophilic) in character. The term "insoluble" as used herein is meant to refer to a polyurethane segment of such a character that if a moderate to high molecular weight polyurethane (for example about 50,000 weight average) were made exclusively of the segment, the polymer would not be soluble in organic solvents such as methyl ethyl ketone, cyclohexanone, toluene, or tetrahydrofuran. On the other hand, a "soluble" segment is one of such a character that if a moderate to high molecular weight polyurethane (for example 50,000 weight average) were made exclusively of the segment, the polymer would be soluble in the above-mentioned solvents. Although the polyurethane backbones may solely comprise hydrophobic or hydrophilic segments the preferred polyurethane backbones comprise both soluble and insoluble segments.

Herein, soluble (hydrophobic) and insoluble (hydrophilic) segments are generally identified and distinguished by relative molecular weight, chain length, and/or relative amount of polar functionality or character. That is, one way for identifying or defining these segments involves a comparison of the ratios of the number of carbon atoms to polar groups in the segment precursor. The term "polar group" as used in this context is meant to refer to such highly polar groups as hydroxy-, sulfonate-, amino-, urethane-, and urea-groups, but not ester, carbonate, or ether functionality. In general, a ratio of less than about 3:1 identifies a precursor to an insoluble segment; whereas, a ratio of greater than about 3:1 identifies a precursor to a soluble segment. For example, under this model neopentyl glycol (5 carbons/2 polar groups) is a precursor to an insoluble segment, and a polycaprolactone triol such as Union Carbide Tone TM 0305 (about 28 carbons/3 polar groups) is a precursor to a soluble segment.

I(a)(ii). Sulfonate Groups

At least one SO$_3$M group is pendant from the polyurethane polymer backbone. The term "pendant" as used herein refers both to a moiety bonded to an interior portion of the polyurethane backbone as well as to a moiety bonded to a terminal portion of the polyurethane backbone. The polyurethane polymer backbone has an SO$_3$M group equivalent weight of from about 2,000 to about 100,000. Most preferably, the polyurethane polymer backbone has an SO$_3$M group equivalent weight of from about 5,000 to 30,000. The cation M designates a cation selected from the group consisting of H$^+$, the alkali metal cations, i.e., Na$^+$, Li$^+$, and K$^+$, and NR$_4^+$ wherein R can be hydrogen or an alkyl group. When R is an alkyl group, R preferably comprises a C$_1$ to C$_4$ alkyl group. M is preferably selected from the group consisting of Li$^+$, Na$^+$, K$^+$, and mixtures thereof, since the corresponding acids, if present in the final polymer, may tend to produce an overall polymer that is subject to decomposition. Preferably, M comprises Na$^+$ for reasons of commercial availability.

Preferably, the SO$_3$M group is an aromatic SO$_3$M group, wherein M is Na$^+$, since at least one example of this type of compound is readily available from commercial sources, it can be easily incorporated into the polyurethane backbone, and its properties are well known. This preferred aromatic sodium sulfonate compound is dimethyl sodium sulfoisophthalate (DMSSIP).

I(a)(iii). Hydroxy Groups

At least two cross-linkable hydroxy groups are pendant from the polyurethane polymer backbone. The polyurethane polymer backbone has a cross-linkable hydroxy group equivalent weight of from about 500 to 50,000. Most preferably, the polyurethane polymer backbone has a cross-linkable hydroxy group equivalent weight of from about 1,000 to 5,000. For magnetic binder use, preferably a majority, more preferably 90% or more, and most preferably all, of the cross-linkable hydroxy groups are pendant from hydrophobic polymer chain segments. That is, the cross-linkable hydroxy groups are preferably positioned within the polymer at locally hydrophobic sites.

By the term "locally hydrophobic" it is meant that the cross-linkable hydroxy groups are preferably located in portions of the polymer that do not include, in the immediate vicinity of a hydroxy group, any moieties that are substantially polar or hydrophilic. Preferably, the hydroxy groups are each positioned in polymer chain segments having lengths of at least about 5 atoms separating the hydroxy group from the nearest polar group. Alternatively phrased, if the hydroxy group is positioned in a substantially hydrophobic fragment or segment whose precursor has a molecular weight of at least about 180, and preferably about 200 to about 1,000, it will be considered to be in a hydrophobic environment (or soluble segment). Most preferably, the hydroxy functionality is substantially centrally positioned within such a fragment or segment. The term "cross-linkable" and variants thereof, when used to refer to moieties in a polymer, is meant to refer to moieties available for cross-linking in final cure. It is not meant or implied that all cross-linkable moieties are necessarily cross-linked during final cure.

I(a)(iv). Thiol Groups

At least one thiol group (—SH) is pendant from the polyurethane polymer backbone. Preferably, the polyurethane polymer has a thiol group equivalent weight of from about 1,000 to 50,000. Most preferably, the polyurethane polymer backbone has a thiol group equivalent weight of from about 3,000 to 10,000. A preferred source of thiol groups is the compound 3-mercapto-1,2-propanediol.

I(b). Method of Preparing the Sulfonated, Thiol and Hydroxy-Functional Polyurethane The general method of preparing the sulfonated, thiol, and hydroxy-functional polyurethane comprises the step of reacting a polyol, a mercapto diol, a polyisocyanate, and a sulfonated diol in order to form the polymer.

The sulfonated, thiol, and hydroxy-functional polyurethane is preferably prepared by reacting a polyol with a thio functional sulfonated polyisocyanate having at least two reactive isocyanate groups and at least one thiol group.

I(b)(i). Polyol

The polyol can be hydrophilic or hydrophobic. Preferably, the polyol is hydrophobic when preparing graft copolymers useful in magnetic recording media. Preferably, the polyol has at least three reactive hydroxy groups and has a hydroxy equivalent weight of at least about 60. Such a polyol can be partially reacted with a thiol functional sulfonated polyisocyanate to prepare a sulfonated, thiol, and hydroxy-functional polyurethane having at least two hydroxy groups available for later cross-linking during cure of the polymer. The polyol is present in a sufficient amount such that there is at least about a 67% excess of reactive hydroxy groups relative to reactive isocyanate groups.

Typically, the polyol is a triol. Preferred triols are triols having a molecular weight greater than about 180. Most preferred are triols having a molecular weight of from about 200 to about 1,000. A preferred class of triols comprises polycaprolactone triols. One particularly useful triol is a polycaprolactone triol having a hydroxy equivalent weight of about 180 and a molecular weight of approximately 540. One such high molecular weight triol is available under the trade designation Tone TM 0305 from Union Carbide Company. Other useful triols include polypropylene oxide triol, and polyester triols other than polycaprolactone triols, e.g. butylene adipate triols or polyols.

Preferably the hydroxy groups in the triol are primary, in order to facilitate curing of the resultant copolymer with a curing agent. The reaction of a polyol with a thio functional sulfonated polyisocyanate is relatively rapid at temperatures of about 45° C. to 70° C. In some instances catalysts, such as dibutyltin dilaurate or dimethyltin dilaurate, may be used to facilitate reaction. It is foreseen, however, that some secondary triols may be utilized according to the present invention. It is also foreseen that mixtures of various triols may be utilized.

I(b)(ii). Thiol Functional Sulfonated Polyisocyanate

The thiol functional sulfonated polyisocyanate can be prepared by reacting a sulfonated polyisocyanate with a mercapto diol. The thiol group(s) of the mercapto diol will remain substantially unreacted with the sulfonated polyisocyanate so long as neutral or acidic conditions are maintained (i.e., a pH of about 7 or less).

Mercapto Diol

The preferred mercapto diol is 3-mercapto-1,2-propanediol. The mercapto diol 2,3 dimercapto butane 1,4-diol and other mercapto diols should also be useful according to the present invention.

Sulfonated Polyisocyanate

The sulfonated polyisocyanate can be prepared by reacting a sulfonated diol (also referred to herein as a sulfonated monomer) and optionally additional short chain or long chain diols (including polycaprolactone diols, polyols, etc.) with an excess of polyisocyanate. Preferably, there is at least about a 5 mole % excess of isocyanate functionality in the polyisocyanate relative to hydroxy functionality in the sulfonated diol.

Polyisocyanate

A wide variety of polyisocyanates may be utilized. A particularly well-known and useful class of polyisocyanates are diisocyanates such as diphenylmethane diisocyanate. Other useful diisocyanates include: isophorone diisocyanate, toluene diisocyanate, hexamethylene diisocyanate, tetramethylene diisocyanate, p-phenylene diisocyanate, and the like. It is noted that mixtures of diisocyanates can also be used.

Sulfonated Diol

A preferred class of sulfonated diols or monomers can be prepared from the reaction of from about two to about four equivalents of an appropriate diol per equivalent of dimethyl sodium sulfoisophthalate (DMSSIP). The isophthalate includes two ester groups that can be readily esterified, by reaction with two equivalents of diol, to lead to an extended diol structure having an aromatic sulfonate group therein. In some instances, catalysts such as tetrabutyltitanate may be used to facilitate the reaction.

The reaction is generally represented by the following scheme:

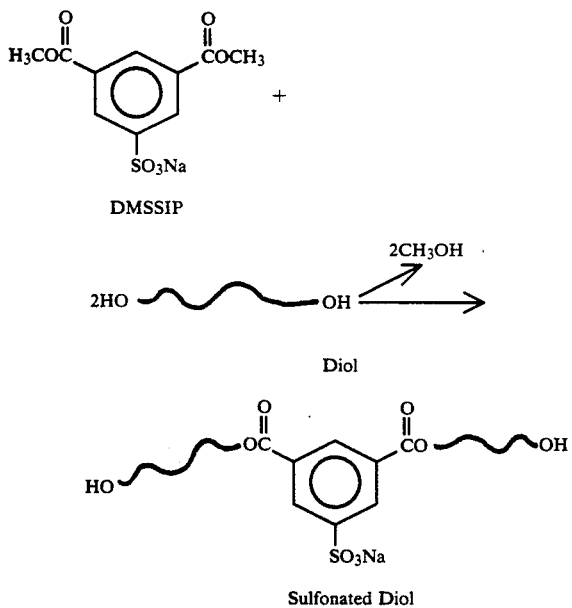

DMSSIP

Diol

Sulfonated Diol

A variety of diols may be utilized. Also, mixtures of diols can be used. A preferred class of diols are the polycaprolactone diols having a hydroxy equivalent weight of from about 200 to 2,000. One such material is Tone TM 0210, available from Union Carbide Company. Tone TM 0210 is a polycaprolactone diol having a hydroxy equivalent weight of about 415. The result of reaction of about 4 equivalents of Tone TM 0210 per equivalent of DMSSIP is a sulfonated diol having a hydroxy equivalent weight of about 603 and a centrally located aromatic sulfonate group.

Other diols which may be reacted with DMSSIP, in order to provide a sulfonated monomer include: polyether diols such as polytetramethylene glycols and polypropylene glycols; polycarbonate diols such as Duracarb 120, a polycarbonate diol available from PPG Industries, Inc., and, polyester diols, such as a polyester diol that is the reaction product of adipic acid and butane diol. Additionally, sodium dimethyl-5-sulfoisophthalate may be utilized with: other diesters or diacids including dimethyl isophthalate, dimethyl terephthalate, and dimethyl adipate; and, diols to produce copolyester diols containing sulfonate. Some examples of such diols are: ethylene glycol; propylene glycol; 1,3-propane diol; 1,4-butane diol; 1,5-pentane diol; 1,6-hexane diol; neopentyl glycol; diethylene glycol; dipropylene glycol; 2,2,4-trimethyl-1,3-pentane diol; 1,4- cyclohexanedimethanol; ethylene oxide and/or propylene oxide adduct of bisphenol A; ethylene oxide and/or propylene oxide adduct of hydrogenated bisphenol A; polyethylene glycol; polypropylene glycol; and, polytetramethylene glycol.

Optional Components

Optionally, it may be desirable to use other polyols in preparing the sulfonated, thiol and hydroxy-functional polyurethane in order to give preferred characteristics to the resultant copolymer. For example, chain extension agents may be incorporated into the polyurethane backbone, to improve ductility or strength characteristics. Such polyols include neopentyl glycol, 1,4-butane diol, 1,6- hexane diol, cyclohexane dimethanol, ethylene glycol, and polyester polyols such as Tone TM 0210 and Tone TM 0230, otherwise referred to herein as non-sulfonated diols. Preferably, at least some low molecular weight diols (less than about 120), i.e., non-sulfonate-containing diols, are used to provide preferred characteristics to the overall product. Also, higher molecular weight non-sulfonated diols, such as the polycaprolactone diols Tone TM 0210 or Tone TM 0230, may be used to provide preferred characteristics to the product. Optionally it may be possible to include fluorinated diols, such as $C_8F_{17}SO_2N[(CH_2)_2OH]_2$ in an amount such that the fluorinated diol comprises about 1 to about 20 weight percent of the polyurethane backbone. It is further noted that for any of the reactants mentioned, mixtures of materials can be utilized.

A Preferred Method of Preparing the Sulfonated, Thiol, and Hydroxy-Functional Polyurethane Polymer A preferred method of preparing the sulfonated, thiol, and hydroxy-functional polyurethane polymer comprises the reaction of the four key components described above: the sulfonated diol; the polyisocyanate; the mercapto diol; and the triol. This preferred method shall be referred to herein as the "prepolymer synthetic method". This method is designed to ensure that substantially all of the unreacted hydroxy groups in the resin that are available for final cure are those hydroxy groups that are pendant from the triol, i.e., the hydrophobic segment precursor. It is noted that if the diol is also a hydrophobic, i.e., soluble, material, it may not be necessary to ensure that all unreacted hydroxy groups result from the triol.

In a first step, the sulfonated diol and any optional polyols such as non-sulfonated diols, are reacted with an excess of the polyisocyanate to form a sulfonated polyisocyanate. There should be a sufficient excess of isocyanate functionality for substantially complete reaction of the diol hydroxy groups. For example, there should be at least a 30% excess of reactive isocyanate functionality in the polyisocyanate relative to hydroxy functionality in the diol and optionally-added polyols. This provides a sulfonated polyisocyanate.

In a second step, an excess of sulfonated polyisocyanate is reacted with the mercapto diol to form a thiol functional sulfonated polyisocyanate.

In a third step, the thiol functional sulfonated polyisocyanate product of the second step is reacted with an excess of the triol. Typically, the triol reactant has a relatively high molecular weight, i.e. a molecular weight of at least about 180, and preferably about 200 to 1,000. The triol should have little other polar functionality other than the hydroxy groups, and the hydroxy groups should be well spaced in the triol. Preferably, there is at least a 67% excess of hydroxy functionality in the triol relative to isocyanate functionality in the sulfonated polyisocyanate.

As one example of the preferred prepolymer synthetic method, a sulfonate diol monomer, neopentyl glycol, and diphenylmethane diisocyanate are combined in methyl ethyl ketone solvent in a ratio such that the number of isocyanate groups per hydroxy group is initially about 2. After all available hydroxy groups have been reacted, a prepolymer is obtained containing an excess of isocyanate. The prepolymer is subsequently reacted with 3-mercapto-1,2-propanediol in order to form a thiol functional sulfonated polyisocyanate. The latter is subsequently reacted with a hydrophobic triol such that the ratio of isocyanate groups to hydroxy groups is within the range of about 0.3 to about 0.6. The resultant sulfonated, thiol, and hydroxy-functional polyurethane polymer product has cross-linkable hydroxy groups pendant from hydrophobic polymer chain segments comprising the triol.

II. Vinyl-Polyurethane Copolymers and a Method of Preparing Using Sulfonated, Thiol and Hydroxy Functional Polyurethane II(a). Vinyl-Polyurethane Copolymers of the Invention The vinyl/polyurethane copolymer of the present invention comprises a polyurethane backbone; at least one $SO_3M$ group pendant from the polyurethane backbone, wherein the polyurethane backbone has an $SO_3M$ equivalent weight of from about 2,000 to about 100,000 and wherein $SO_3M$ is as defined above; at least two crosslinkable hydroxy groups pendant from the polyurethane backbone, wherein the polyurethane backbone has an OH equivalent weight of from about 500 to about 50,000; and one or more monovalent moieties of the formula —S—B pendant from the polyurethane backbone, wherein B represents a polymer segment comprising polymerized free radically polymerizable monomer.

The vinyl-polyurethane copolymers of the present invention have a well-defined structure. The polyurethane segment provides a soft segment and the vinyl polymeric segment(s) provide the hard segments of the copolymer. The chemical nature or composition of the vinyl polymeric segment(s) can be modified to increase the $T_g$ of the copolymer, to lower the surface energy of the copolymers, to impart adhesive properties to the copolymer, and to synthesize solvent resistant copolymers. The properties of the copolymer are determined by both the urethane content (weight percentage) of the copolymer and the molecular weight of the urethane chain, with higher urethane content and/or molecular weight providing greater toughness. Various properties such as durability of the copolymer can be varied by varying the molecular weights of the polyurethane or vinyl polymeric segment(s) and the weight ratio of the respective segments. The copolymers can be used for a number of purposes including as binders in magentic recording media.

The molecular weight of each polymerized vinyl segment should range from about 2,000 to about 100,000, preferably about 3,000 to about 10,000 in order to obtain the optimum dispersion viscosity of dispersions useful in preparing magnetic recording media which include the copolymer of the present invention as a binder. The combined molecular weights of the polyurethane backbone and the $SO_3M$, OH, and thiol groups should range from about 3,000 to about 50,000, preferably about 5,000 to about 15,000 in order to obtain the optimum dispersion viscosity of dispersions useful in preparing magnetic recording media which include the copolymer of the present invention as a binder.

The ratio of the combined molecular weights of the polyurethane backbone and the $SO_3M$, OH, and S groups to the combined molecular weights of the vinyl polymer segment or segments B generally ranges from about 5:95 to about 95:5, preferably about 20:80 to about 80:20 in order to obtain a durable material with a high $T_g$ suitable for use as a binder in magnetic recording media.

The $T_g$ of the vinyl segment or segments of the copolymer of the present invention should range from about $-80°$ C. to about $150°$ C., preferably about $20°$ C. to about $120°$ C., and for magnetic binder use at least about $50°$ C., preferably about $50°$ C. to about $100°$ C.

The preferred copolymers are those wherein the polymeric segment(s) B comprise polymerized free radically polymerizable monomer selected from the group consisting of styrene, halogenated styrenes, alkylated styrenes, methoxystyrenes, acrylic acid, methacrylic acid, acrylonitrile, acrylamide, methacrylamide, methyl methacrylate, methyl acrylate, ethyl acrylate, isopropyl acrylate, n-butyl acrylate, 2-ethylhexyl acrylate, isobornyl acrylate, glycidyl acrylate, vinyl chloride, vinylidene chloride, vinyl acetate, maleic acid, maleic acid esters, maleic anhydride, conjugated di-olefins, N-ethylperfluorooctanesulfonamidoethyl acrylate, N-ethylperfluorooctanesulfonamidoethyl methacrylate, N-butylperfluorooctanesulfonamidoethyl acrylate, N-butylperfluorooctanesulfonamidoethyl methacrylate, N-methylperfluorooctanesulfonamidoethyl acrylate, N-methylperfluorooctanesulfonamidoethyl methacrylate, hydroxyethyl acrylate, hydroxypropyl acrylate, 2-hydroxyethyl methacrylate, hydroxypropyl methacrylate, other acrylic and methacrylic esters and amides, and mixtures thereof.

B, which is defined above, can comprise a homopolymer segment or a copolymer segment. Most preferably, B comprises a copolymer segment comprising polymerized free radically polymerizable monomer selected from the group consisting of a mixture of styrene and 2-hydroxy ethyl methacrylate, a mixture of methyl methacrylate and 2-hydroxy ethyl methacrylate, and a mixture of styrene and acrylonitrile.

II(b). Preparation of the Vinyl/Polyurethane Copolymers of the Invention

The copolymerization of the free radically polymerizable monomer and the sulfonated, thiol, and hydroxy-functional polyurethane to produce the graft copolymers of the invention is by step-wise free radical polymerization. The free radically polymerizable monomer is dissolved in a suitable solvent, if needed, and polymerized by free radical polymerization. The reaction typically is conducted under inert atmospheric conditions such as under a nitrogen atmosphere. Generally, the weight ratio of the sulfonated, thiol, and hydroxy-functional polyurethane to the free radically polymerizable monomer ranges from about 5:95 to 95:5, preferably about 20:80 to about 80:20, respectively.

Initiators

An effective amount of an initiator is used in the polymerization method of the present invention. Generally about 0.2 to 0.5 weight percent of an initiator is used based upon the weight of the free radically polymerizable monomer used in forming the polymeric segment or segments B.

Useful initiators are known to practitioners skilled in the art and are detailed in Chapters 20 and 21 Macromolecules, Vol. 2, 2nd Ed., H. G. Elias, Plenum Press, 1984, New York, incorporated by reference herein. Useful thermal initiators include, but are not limited to, the following: azo compounds such as 2,2-azo-bis-(isobutyronitrile), dimethyl 2,2'-azo-bis-isobutyrate, azo-bis-(diphenyl methane), 4-4'-azo-bis-(4-cyanopentanoic acid); peroxides such as benzoyl peroxide, cumyl peroxide, tert-butyl peroxide, cyclohexanone peroxide, glutaric acid peroxide, lauroyl peroxide, methyl ethyl ketone peroxide; hydroperoxides such as tert butyl hydroperoxide and cumene hydroperoxide; peracids such as peracetic acid and perbenzoic acid; and peresters such as diisopropyl percarbonate.

Certain of these initiators (in particular the peroxides, hydroperoxides, peracids, and peresters) can be induced to decompose by addition of a suitable catalyst rather than thermally. This redox method of initiation is described in Elias, Chapter 20.

Useful photochemical initiators include but are not limited to benzoin ethers such as diethoxyacetophenone, oximino-ketones, acylphosphine oxides, diaryl ketones such as benzophenone and 2-isopropyl thioxanthone, benzil and quinone derivatives, and 3-ketocoumarins as described by S. P. Pappas, J. Rad. Cur., July 1987, p. 6.

Preferably, the initiator used comprises a thermally decomposed azo or peroxide compound for reasons of solubility and control of the reaction rate. Most preferably, the initiator used comprises 2,2'-azo-bis-(isobutyronitrile) for reasons of cost and appropriate decomposition temperature.

Method of Initiation

The homolytic decomposition of the initiator to form free radicals can be induced by heat energy (thermolysis), light energy (photolysis) or the addition of a suitable catalyst depending upon the initiator used. "Initiator free" polymerization may also be induced electronically or by exposure to ionizing radiation. The perferred method of initiation comprises thermolysis which can be readily employed in standard reactors. Thermolysis also provides ease of control of the reaction rate and exotherm.

It should be understood that minor amounts of the free radically polymerizable monomer forming the grafted polymer segment(s) may be present as a homopolymer in the copolymer composition. Such minor amounts of homopolymer may be produced in an unwanted side reaction during polymerization of the copolymer.

The reaction is preferably conducted in a vessel with agitation to permit uniform exposure of the reactants to the energy source. While most of the reactions have been conducted by employing a batch process, it is possible to utilize the same technology in a continuous polymerization operation.

Solvents

The reaction mixture may include a sufficient amount of a suitable solvent, if needed, but it is not necessary since many of the monomeric materials are liquid themselves and may thus be charged into the reaction vessel without utilization of a solvent. Preferably, a solvent is utilized in order to decrease the viscosity during the reaction and to facilitate polymerization by allowing for efficient stirring and heat transfer. The solvent may be any substance which is liquid in a temperature range of about −10° C. to 50° C., is inert to the reactants and product, and which does not adversely affect the reaction.

Examples of suitable solvents include but are not limited to water, ketones such as methyl ethyl ketone (MEK) and acetone, alkyl acetates such as ethyl acetate, esters such as ethyl acetate and butylacetate, aromatic hydrocarbons such as toluene and benzene, ethers such as tetrahydrofuran (THF), and mixtures thereof. Other solvent systems are useful. Generally, the amount of solvent utilized ranges from about 30 to about 90 percent by weight, preferably about 40 to about 75 percent by weight, based upon the total weight of the reactants and solvents for reasons of yielding fast reaction times and high molecular weight at appropriate product viscosities. In addition to solution polymerization herein described, the copolymerization may be carried out by other well known techniques such as suspension, emulsion, and bulk polymerization. Solution polymerization is preferred due to the ease of coreaction of the sulfonated, thiol, and hydroxy-functional polyurethane; initiator; and free radically polymerizable monomer.

The method of making the copolymer of the invention involves mixing sulfonated, thiol and hydroxy-functional polyurethane polymer with a monomer charge comprising free radically polymerizable monomer capable of being polymerized in order to form a polymeric segment(s) B, sufficient solvent, if needed, and an initiator capable of forming free radicals upon being subjected to a means of initiation wherein the free radicals are capable of abstracting the —SH hydrogen atoms of the sulfonated thiol and hydroxy-functional polyurethane in order to form sulfonated thiol and hydroxy-functional free radicals. The sulfonated thiol and hydroxy-functional free radicals should be capable of initiating free radical polymerization of the free radically polymerizable monomer in order to form a graft copolymer. Free radical polymerization is initiated and sustained until the copolymer is produced.

III. Thiol and Hydroxy-Functional Polyurethane Copolymers and a Method of Making The present invention also relates to a non-sulfonated graft copolymer comprising a polyurethane backbone; at least three crosslinkable hydroxy groups pendant from the polyurethane backbone, wherein the polyurethane backbone has a hydroxy equivalent weight of from about 500 to about 50,000; and one or more monovalent moieties of the formula —S—B pendant from the polyurethane backbone wherein B is as previously defined and wherein the weight ratio of the polyurethane backbone, OH, and S to the polymer segment(s) B ranges from about 5:95 to about 95:5; and to dispersions and composites comprising the graft copolymer. The copolymer is formed according to the method of preparing the vinyl-sulfonated and hydroxy-functional polyurethane copolymers described above except for the replacement of the sulfonated diol with a suitable non-sulfonated polyol. Examples of suitable non-sulfonated polyols include but are not limited to non-sulfonated diols such as polyester diols, polyether diols, and polycarbonate diols.

The invention also relates to dispersions which comprise a non-sulfonated graft copolymer wherein the graft copolymer comprises a polyurethane backbone; two crosslinkable hydroxy groups pendant from the polyurethane backbone, wherein each hydroxy group is pendant from an opposite end of the polyurethane backbone, and wherein the polyurethane backbone has a hydroxy equivalent weight of from about 500 to about 50,000; and one or more monovalent moieties of the formula —S—B pendant from the polyurethane backbone wherein B is as defined above and wherein the weight ratio of the polyurethane backbone, OH, and S to the polymer segment(s) B ranges from about 5:95 to about 95:5. The copolymer can be prepared in a manner similar to the method of preparing the vinyl/SHPU copolymer except that the linear polyurethane backbone can be prepared by reacting a mercapto diol and polyisocyanate such that the ratio of isocyanate groups to hydroxy groups is close to, but less than 1 to 1, but preferably greater than about 0.95 to 1. Suitable diols include those useful for preparing vinyl-HPU polyurethane which are described above. A vinyl-HPU graft copolymer can subsequently be prepared from the linear thiol polyurethane in the manner described above for vinyl-HPU and vinyl-SHPU graft copolymers.

IV. Preparation of Dispersions of Magnetic Powder

Dispersions for preparing magnetic recording media of the present invention generally comprise a magnetic or magnetizable pigment and the curable copolymer (i.e., binder) described above in an appropriate solvent system. The dispersion can be readily applied or coated onto a suitable substrate. A variety of materials can be utilized as the substrate including polyesters, cellulose acetates, polyvinylchlorides, and the like. A variety of solvent systems known in the art can be utilized. The solvent may be any substance which is liquid in a temperature range of about −10° C. to 50° C., is inert to the dispersion components, and will not adversely affect the magentic media preparation. Examples of useful solvents include polar aprotic solvents such as tetrahydrofuran, ketones such as methyl ethyl ketone, organic esters such as ethyl acetate, and the like.

Addition of wetting agents or dispersing agents can generally be avoided when using vinyl/SHPU, even with relatively high load situations, e.g., about 70% to 85% by weight of magnetic pigment, based on the weight of the total solids of the dry coating, and high density situations, e.g., at least about 30,000 flux changes per inch. A variety of pigments can be used including: ferric oxides; gamma ferric oxides; cobalt doped gamma ferric oxides; chromium oxide; iron; iron-cobalt; cobalt; nickel; cobalt-nickel; cobalt-phosphorus; and barium ferrite.

A variety of loadings, densities, solvent systems, etc. can be used. The following conditions are typical: about 100 parts by weight of fine pigment such as ($Co$—$\gamma$—$Fe_2O_3$) having a surface area 50 $m^2/g$ and a powder coercivity of 780 Oersted; about 15 to 40 parts by weight of binder (i.e. copolymer); and about 150 to 400 parts by weight of solvent can be combined with steel milling media and milled by agitation in a steel container until the pigment is dispersed. The dispersion can be readily cured with a multi-functional isocyanate curing agent. After the dispersion containing pigment, solvent, and binder is prepared, the curing agent is typically added. A typical curative can comprise a triisocyanate such as the 3:1 adduct of toluene diisocyanate with trimethylol propane. One such commercially available material has the trade designation "Mondur" CB-601, available from Mobay Chemical Corporation. The curative is preferably added in a proportion of about 1 to 20%, based upon the weight of the binder. The resulting dispersion can be readily applied to a polymeric backing, e.g., polyethylene terephthalate, using a knife coating method. In some applications, e.g., back-coat, magnetic particles need not be used in the binder composition. Immediately after coating, and while the solvent is still present and the binder is substantially uncured, the coated substrate typically undergoes orientation in a magnetic field to align the magnetic particles. After coating and orienting the substrate is dried of solvent and cured. A cure can be effected either at room temperature or at elevated temperatures (50°–60° C.). The curing retains the pigment in the oriented manner. Preferably, the magnetizable pigment is oriented to a squareness ratio of at least about 0.75.

A variety of additives can be incorporated into the dispersions useful in the present invention. These include head-cleaning agents and lubricants. If the binder described herein is used as a back-coat for magnetic media, the back-coat can optionally include non-magnetizable pigments, such as, for example, carbon black, graphite, aluminum oxide, titanium dioxide, zinc oxide, silica gel, calcium carbonate, and barium sulfate. The binder described herein can be used to prepare magnetic media such as tapes, e.g., video tapes, computer tape and data cartridge tape, and diskettes, both single-sided and double-sided.

Dispersions of vinyl/HPU graft copolymers can be prepared according to the method described above for preparing vinyl/SHPU dispersions except for the addition of an effective amount of a suitable dispersing agent, preferably about 1 to about 10 weight percent based upon the pigment weight in order to disperse the pigment. Suitable dispersants are known to those skilled in the art and include lecithin and quaternary ammonium acetates or phosphates such as Emcol TM acetate, a polypropylene oxide adduct of diethyl ethanolamine quarternized with ethylene oxide and acetic anhydride, having a molecular weight of about 2300, and Emcol TM phosphate, a polypropylene oxide adduct of diethyl ethanolamine quarternized with ethylene oxide and phosphoric acid, both available from Witco Chemical Co., and disclosed in U.S. Pat. No. 4,837,082, incorporated by reference herein. About 1 to about 10 weight percent of a wetting agent can also be included based upon the weight of the pigment. Suitable wetting agents are known to those skilled in the art and include phosphoric acid esters such as mono-phosphorylated propylene oxide adducts of glycerine, e.g., the reaction product of 1 mole of phosphorous oxychloride with the reaction product of 10–11 moles of propylene oxide and 1 mole of glycerine.

The magnetic recording medium comprising vinyl/HPU is preferably prepared by mixing crude particulate solid pigment into a mixture comprised of solvent, wetting agent, and dispersing agent. At least a portion of the crosslinkable copolymer is then added to form a wetting slurry. The wetting slurry is then milled until the average particle size of the crude magnetic particles is small enough such that the dispersion exhibits the desired smoothness. Any remaining copolymer and additional fluidizing solvents can be added after milling. The milling process will yield a stable dispersion of finely divided magnetic particles dispersed in a fluidizing solvent. This stable dispersion is then mixed with the crosslinker to form a curable composition and is coated and cured as described above.

EXAMPLES

The detailed description includes exemplary preparations of sulfonated, thiol, and hydroxy-functional polyurethane and copolymers made therewith. All parts and percentages throughout the Examples and the rest of the specification are by weight unless otherwise specified.

DEFINITION OF TERMS

Molecular Weight

The "number average molecular weight $(\overline{M}_w)$" and "weight average molecular weight $(\overline{M}_w)$" are well-known mathematical descriptions of the molecular weight distribution of a polymer sample.

Polydispersity

The "polydispersity", abbreviated $\rho$, is a measure of the molecular weight distribution of a polymer and is defined as $\overline{M}_w/\overline{M}_n$.

Glass Transition Temperature

The "glass transition temperature" $(T_g)$ is a well known temperature at which amorphous material changes from a glassy state to a ductile state.

Each of the foregoing is a well-known term used by polymer chemists and others. Further explanation of the derivation of these terms may be found in J. F. Rabek's *Experimental Methods in Polymer Chemistry*, Wiley and Sons, 1981.

Equivalent Weight

The term "equivalent weight" as used herein and with respect to a functionality or moiety, refers to the mass of polymer per mole, or equivalent, of functionality.

TEST METHODS

The test methods used to evaluate the copolymers of the examples are industry standard tests. The test methods which characterize the copolymers are those which demonstrate its molecular architecture. The gel permeation chromatography (GPC) and differential scanning calorimetry (DSC) measurement results have been obtained. The standard tests are described in detail in various publications of the American Society for Testing and Materials (ASTM), Phila., Pa. The standard test methods are described in detail below. The reference source of each of the standard test methods is also given.

Gel Permeation Chromatography

The characterization of the molecular weight distribution of the polymers has been by conventional gel permeation chromatography (GPC). A Hewlett-Packard Model 1084B, high performance liquid chromatograph equipped with Styrgel ™ columns was used. The system was calibrated using polystyrene standards. All molecular weight averages are polystyrene equivalent molecular weights. The molecular weight averages and polydispersities were calculated according to accepted practices. GPC test methods are further explained in "Modern Size Exclusion Liquid Chromatography" *Practice of Gel Permeation Chromatography*, John Wiley and Sons, 1979.

Differential Scanning Calorimetry

A small amount of dried film was placed in the DSC chamber of a Perkin-Elmer DSC-2 differential scanning calorimeter under nitrogen atmosphere. The sample was cooled from room temperature to $-50°$ C. and then heated to $150°$ C. at $20°$ C. per minute. The $T_g$ was taken as the midpoint of the curve in the glass transition region.

Inherent Viscosity

The inherent viscosity of each composition was measured to provide a comparison of the molecular weight of each composition. The inherent viscosity was measured by conventional means using a Wescan #50 viscometer in a water bath controlled at $25°$ C. to measure the flow time of 10 milliliters of a polymer solution (0.8 grams per deciliter of polymer in tetrahydrofuran solvent) and the flow time of the solvent. In each experiment, inherent viscosity is reported in deciliters per gram.

ICI Viscosity

The ICI viscosity of various magnetic media binder dispersions of the invention were measured on an ICI Rotating Cone and fixed plate viscometer from Research Equipment, Ltd. (London) which provided a measurement of viscosity in centipoise.

Abbreviations

CB-601 = a triisocyanate crosslinker comprising a toluene diisocyanate-based adduct of unspecified triols and diols which contains 10.4% NCO and is supplied as a 60% solution in ethylene glycol diacetate, available from Mobay Chemical Corporation ISK 9966 = iron oxide pigment available from Ishihara Sangyo Kaisha, Ltd.

Vazo ™ 64 = 2,2'-azo-bis(isobutyronitrile) available from DuPont

Tone ™ 0210—a polycaprolactone by Union Carbide, molecular weight about 825, hydroxy equivalent weight about 415, precursor to a sulfonate diol.

Neopentyl glycol—a low molecular weight diol molecular weight 104, hydroxy equivalent weight 52, additive for providing preferred characteristics.

DMSSIP dimethyl sodium sulfoisophthalate, an aromatic sodium sulfonate salt, molecular weight 296, equivalent weight 148, preferred metal sulfonate salt.

Tone ™ 0305—a polycaprolactone triol hydroxy equivalent weight about 180, about 28 carbons/3 polar groups, precursor to a soluble segment.

Tone ™ 0301—a polycaprolactone triol produced by Union Carbide, molecular weight about 297, hydroxy equivalent weight about 99, about 15 carbons/3 polar groups, precursor to a soluble segment.

Diphenylmethane diisocyanate—an isocyanate, molecular weight 250, isocyanate equivalent weight 125.

EXAMPLES

Example 1

Preparation of Sulfonate Monomer 4:1 Polycaprolactone Diol/DMSSIP Monomer 149.4 pounds (163 equivalents) Tone ™ 0210 polycaprolactone diol, 18 pounds of toluene, and 12.6 pounds of dimethylsodium sulfoisophthalate (41 equivalents) were combined in a reaction vessel and then heated to 80° C. with distillation of toluene. The remainder of the toluene was removed under vacuum at 100° C. The vacuum was released under nitrogen and 40 grams of tetrabutyl titanate were added. The system was then heated to 200° C. under nitrogen and held for 3 hours while collecting methanol distillate. After cooling to 120° C., a vacuum was pulled on the reaction and these conditions were maintained for 4 hours. The resultant product was then filtered and cooled. The hydroxy equivalent weight by analysis was determined to be 620 grams/equivalent. The sulfonate equivalent weight was determined to be 3550 grams/equivalent.

Example 2

Preparation of Thiol Sulfonated Hydroxy-Functional Polyurethane (Thio SHPU)

60 grams (0.097 hydroxy equivalent) of sulfonate monomer prepared according to Example 1 was added to 241 grams of THF and 7.2 grams (0.138 equivalent) of neopentylglycol in a 1 liter flask. Next, 57.91 grams (0.463 equivalent) of diphenylmethane diisocyanate and 0.1 gram of dibutyltin dilaurate were added to the above mixture and the components were heated at reflux for 1 hour. Next, 4.8 grams (0.089 equivalent) of 3-mercapto-1,2-propanediol was added to the flask and the mixture was heated under reflux for 7 hours. Next, 23.48 grams (0.261 equivalent) of Tone ™ 0301 polycaprolactone triol and 44 grams of tetrahydrofuran were added to the flask and the reflux was continued for 15 hours until no isocyanate was detected by infrared spectroscopy. The final inherent viscosity was determined to be 0.232. Calculated equivalent weights were: 9336 sulfonate, 3556 thiol, and 1344 hydroxy.

Example 3

Preparation of Thiol Sulfonated Hydroxy-Functional Polyurethane (Thio SHPU)

Into a 1-liter flask were charged 65 grams (0.105 equivalent) of sulfonate monomer prepared according to Example 1, 7.8 grams (0.150 equivalent) of neopentyl glycol, and 156 grams of tetrahydrofuran (50% solids). Next, 57.04 grams (0.0456 equivalent) of diphenylmethane diisocyanate and 0.1 gram of dibutyltin dilaurate were added to the above mixture and the components were heated at reflux for 1½ hours. Next, 5.2 grams (0.096 equivalent) of 3-mercapto-1,2-propanediol were added to flask and reflux was maintained for 7 more hours. 25.32 grams (0.281 equivalent) of Tone ™ 0301 polycaprolactone triol and 203 grams of THF were added to the flask and reflux was continued for 15 hours until the isocyanate peak was no longer observed in the infrared spectrum. The final inherent viscosity in the THF was 0.185. The calculated equivalent weights were: 9046 sulfonate, 3445 thiol, and 1308 hydroxy.

Example 4

Thio SHPU/MMA/HEMA Copolymer (46/41/13)

Into a 240 ml amber reaction bottle was charged 100.0 grams of the Thio SHPU prepared according to Example 3; 30 grams of methyl methacrylate (MMA); 8.41 grams of 2-hydroxy ethyl methacrylate (HEMA); and 0.092 gram of Vazo ™ 64 initiator. The head space was flushed with nitrogen for 2 minutes at 1 l/min. after which the bottle was sealed. The sealed bottle containing the clear solution was tumbled in a constant temperature bath for 20 hours at 55° C. resulting in a viscous clear solution containing Thio SHPU/MMA/HEMA. The properties of the copolymer obtained are set forth in Table I, Example 4.

Example 5

Thio SHPU/MMA/HEMA Copolymer (46/48/6)

The procedure of Example 4 was repeated. The charges of components were as follows: Thio SHPU prepared according to Example 2 (91.2 grams, 33.0% solids in THF), MMA (3.50 grams), HEMA (4.0 grams), and Vazo ™ 64 initiator (0.12 gram). The solution was tumbled in a constant temperature bath for 23 hours at 55° C. in order to obtain Thio SHPU/MMA/HEMA (46/48/6). The properties of the copolymer obtained are set forth in Table I, Example 5.

Example 6

Thio SHPU/MMA/HEMA Copolymer (51/43/6)

The procedure of Example 4 was repeated. The charges of components were as follows: Thio SHPU prepared according to Example 2 (91.0 grams, 33.0% solids in THF), MMA (30.0 grams), HEMA (4.0 grams), and Vazo ™ 64 initiator (0.11 gram). The solution was tumbled in a constant temperature bath for 23 hours at 55° C. in order to obtain Thio SHPU/MMA/HEMA (51/43/6). The properties of the copolymer obtained are set forth in Table I, Example 6.

Example 7

Thio SHPU/STY/HEMA Copolymer (44/44/12)

The procedure of Example 4 was repeated. The charges of components were as follows: Thio SHPU prepared according to Example 3 (100.0 grams, 30.0% solids in THF), styrene (STY) (40.0 grams), HEMA (8.4 grams), and Vazo ™ 64 initiator (0.09 gram). The solution was tumbled in a constant temperature bath for 20 hours at 55° C. in order to obtain Thio SHPU/STY/HEMA (44/44/12). The properties of the copolymer obtained are set forth in Table I, Example 7.

Example 8

Thio SHPU/MMA/HEMA/EtFOSEA Copolymer (50/40/5/5)

The procedure of Example 4 was repeated. The charge of components were as follows: Thio SHPU prepared to Example 3 (100.0 grams, 35.6 percent solids in THF), MMA (28.5 grams), HEMA (3.60 grams), EtFOSEA (3.60 grams), and Vazo ™ 64 initiator (0.35 gram). The solution was tumbled in a constant temperature bath for 20 hours at 55° C. in order to obtain Thio SHPU/MMA/HEMA/EtFOSEA 50/40/5/5. The properties of the copolymer obtained are set forth in Table I, Example 8.

Control Example 12

Preparation of SHPU 92 kilograms of MEK, 4.0 kilograms of neopentyl

TABLE I

| Example | Formulation | Appearance[1] | Inherent Viscosity (deciliters/g) | Tg °C. | Mw | Mn | Mw Mn | OH Equivalent | % Crosslinked[2] With CB601 Crosslinker |
|---|---|---|---|---|---|---|---|---|---|
| 4 | ThioSHPU/MMA/ HEMA 46/41/13 | clear | 0.164 | 17 and 92 | 41,044 | 5,861 | 7.0 | 459 | 76.5 |
| 5 | ThioSHPU/MMA/ HEMA 46/48/6 | clear | 0.201 | 35.0 and 99.0 | — | — | — | — | 85.5 |
| 6 | ThioSHPU/MMA/ HEMA 51/43/6 | clear | 0.165 | 37.0 and 103.0 | 60,919 | 10,895 | 5.6 | — | 83.4 |
| 7 | ThioSHPU/ST/ HEMA 44/44/12 | clear | 0.159 | 28.0 | 72,000 | 7,116 | 10.1 | — | 86.9 |
| 8 | ThioSHPU/MMA/ HEMA/EtFOSEA 50/40/5/5 | clear | 0.160 | 41 | 27,406 | 5,463 | 5.0 | — | 72.3 |

[1] A clear appearance is indicative that grafting has taken place.
[2] In order to determine the percentage of cross-linking the copolymer of each Example was mixed with CB-601 triisocyanate crosslinker, available from Mobay Chemical Corporation, in a 90:10 ratio and the resulting mixture was coated on siliconized paper and kept in a controlled temperature environment (25° C., 50% Relative Humidity) for 4–5 days. A known amount of the dried film was combined with THF and placed in a shaker for 2 hours. The heterogeneous solution was filtered and the undissolved film was weighed to calculate the percentage of crosslinking.

The copolymers of the present invention are extremely useful in magnetic recording binder applications. ICI viscosity, smoothness (examined under a microscope), and iron oxide pigment dispersing ability of the copolymers of the invention were determined by means of a milling experiment in Examples 9–11 and Control Example 13 the results of which are set forth in Table II.

Example 9

Magnetic Media Binder Dispersion

Into a 150 ml steel milling container were charged 19.3 grams (27.0% solids in THF) of the copolymer solution prepared according to Example 6, 56.1 grams of THF, 25 grams of ISK 9966 iron oxide, and 250 grams of ⅛ inch steel media. The milling container was capped and placed in a holder. The holder containing the capped milling container was placed in a paint shaker and shaken 30 minutes and then allowed to remain stationary for 20-30 minutes. This alternating procedure was continued for 2-3 hours. After milling, the sample was drained in a 120 ml wide-mouth jar.

Example 10

Magnetic Media Binder Dispersion

The procedure of Example 9 was repeated. The charges of components were as follows: 12.22 grams (42.0% solids in THF) of the copolymer prepared according to Example 4, 63.2 grams of THF, 25.0 grams of ISK 9966 iron oxide, and 250 grams of ⅛ inch steel media.

Example 11

Magnetic Media Binder Dispersion

The procedure of Example 9 was repeated. The charges of components were as follows: 17.8 grams (29.0% solids in THF) of the copolymer prepared according to Example 5, 57.6 grams of THF, 25.0 grams of ISK 9966 iron oxide, and 250 grams of ⅛ inch steel media.

glycol (76.3 equivalents), and 15.9 kilograms of sulfonate monomer prepared according to Example 1 (30.9 equivalents) were combined and 14 kilograms of MEK were distilled off. 17.4 kilograms of MDI (139.4 equivalents) and 23 grams of dibutyltindilaurate were added. The reaction was held at 35° C. for 3 hours whereupon this prepolymer solution was drained to a holding container.

22 kilograms of MEK and 12.1 kilograms of Tone TM 305 (66.6 equivalents) were combined in the reaction vessel whereupon the prepolymer solution was added to this reaction mixture with stirring. After the isocyanate had reacted, a further addition of 1.3 kilograms of MDI gave a final inherent viscosity in tetrahydrofuran of 0.29. The product had a hydroxy equivalent weight of 1700 grams/equivalent and a sulfonate equivalent weight 11,000 grams/equivalent.

Control Example 13

Magnetic Media Binder Dispersion

The procedure of Example 9 was repeated. The charges of components were as follows: 15.1 grams (34.0% solids in THF) of sulfonated hydroxy functional polyurethane prepared according to Control Example 12, 60.3 grams of THF, 25.0 grams of ISK 9966 iron oxide, and 250 grams of ⅛ inch steel media.

TABLE II

| Sample | ICI Viscosity (Centipoise) | Smoothness |
|---|---|---|
| Example 9 | 15 | Good |
| Example 10 | 15 | Good |
| Example 11 | 14 | Good |
| Control Example 13 | 15 | Good |

The data contained in Table II demonstrates that the copolymers contained the dispersions prepared according to Examples 9–11 and Control Example 13 dispersed the iron oxide pigment well in the milling experiment. There were no differences between the dispersion of Control Example 13 and the three dispersions prepared according to Examples 9–11 upon examining them under a microscope. The dispersion smoothness and viscosity of the three dispersions prepared according to Examples 9-11 appeared the same as the dispersion prepared according to Control Example 13 to the naked eye. The ICI viscosities were all substantially the same. Thus, the copolymers used in Examples 9-11 should yield dispersions comparable to, or better than, the dispersions prepared with sulfonated hydroxy functional polyurethane.

While this invention has been described in connection with specific embodiments, it should be understood that it is capable of further modification. The claims herein are intended to cover those variations which one skilled in the art would recognize as the chemical equivalent of what has been described here.

What is claimed is:

1. A composite for magnetic recording comprising;
   (a) a substrate having a front side and a back side; and
   (b) a cured dispersion coating on at least one side comprising a cured polymer comprising
       (i) a polyurethane backbone;
       (ii) at least one $SO_3M$ group pendant from the polyurethane backbone, wherein the polyurethane backbone has an $SO_3M$ equivalent weight of from about 2,000 to about 10,000, and where M is selected from the group consisting of $H^+$, $NR_4^+$ wherein R can be $H^+$ or an alkyl group, $Li^+$, $Na^+$, $K^+$, and mixtures thereof;
       (iii) at least two crosslinkable hydroxy groups pendant from the polyurethane backbone, wherein the polyurethane backbone has a hydroxy equivalent weight of from about 500 to about 50,000; and
       (iv) at least one monovalent moiety of the formula —S—B pendant from the polyurethane backbone wherein
           B represents a polymer segment comprising polymerized free radically polymerizable monomer, wherein the weight ratio of the polyurethane backbone and $SO_3M$, OH, and S to the polymer segment(s) B ranges from about 5:95 to about 95:5 and a magnetic pigment dispersed in said cured dispersion.

2. A composite for magnetic recording comprising:
   (a) a substrate having a front side and a back side; and
   (b) a cured dispersion coating on at least one side comprising a cured polymer comprising
       (i) a polyurethane backbone;
       (ii) at least three crosslinkable hydroxy groups pendant from the polyurethane backbone, wherein the polyurethane backbone has a hydroxy equivalent weight of from about 500 to about 50,000; and
       (iii) at least one monovalent moiety of the formula —S—B pendant from the polyurethane backbone wherein
           B represents a polymer segment comprising polymerized free radically polymerizable monomer, wherein the weight ratio of the polyurethane backbone, OH, and S to the polymer segment(s) B ranges from about 5:95 to about 95:5; a dispersing agent; and a magnetic pigment dispersed in said cured dispersion.

3. A dispersion for use in magnetic recording media comprising:
   (a) a graft copolymer comprising
       (i) a polyurethane backbone;
       (ii) at least one $SO_3M$ group pendant from the polyurethane backbone, wherein the polyurethane backbone has an $SO_3M$ equivalent weight of from about 2,000 to about 10,000, and wherein M is selected from the group consisting of $H^+$, $NR_4^+$ wherein R can be $H^+$ or an alkyl group, $Li^+$, $Na^+$, $K^+$, and mixtures thereof;
       (iii) at least two crosslinkable hydroxy groups pendant from the polyurethane backbone, wherein the polyurethane backbone has a hydroxy equivalent weight of from about 500 to about 50,000; and
       (iv) at least one monovalent moiety of the formula —S—B pendant from the polyurethane backbone wherein
           B represents a polymer segment comprising polymerized free radically polymerizable monomer, wherein the weight ratio of the polyurethane backbone and $SO_3M$, OH, and S to the polymer segment(s) B ranges from about 5:95 to about 95:5; and
   (b) a magnetizable pigment and optionally a nonmagnetizable pigment dispersed in said copolymer.

4. A dispersion for use in magnetic recording media comprising:
   (a) a graft copolymer comprising
       (i) a polyurethane backbone;
       (ii) at least three crosslinkable hydroxy groups pendant from the polyurethane backbone, wherein the polyurethane backbone has a hydroxy equivalent weight of from about 500 to about 50,000; and
       (iii) at least one monovalent moiety of the formula —S—B pendant from the polyurethane backbone wherein
           B represents a polymer segment comprising polymerized free radically polymerizable monomer, wherein the weight ratio of the polyurethane backbone, OH, and S to the polymer segment(s) B ranges from about 5:95 to about 95:5;
   (b) a dispersing agent; and
   (c) a magnetizable pigment dispersed in said copolymer.

5. A dispersion for use in magnetic recording media comprising:
   (a) a graft copolymer comprising:
       (i) a polyurethane backbone;
       (ii) two crosslinkable hydroxy groups pendant from the polyurethane backbone, wherein each hydroxy group is pendant from an opposite end of the polyurethane backbone, and wherein the polyurethane backbone has a hydroxy equivalent weight of from about 2500 to about 50,000; and
       (iii) at least one monovalent moiety of the formula —S—B pendant from the polyurethane backbone wherein
           B represents a polymer segment comprising polymerized free radically polymerizable monomer, wherein the weight ratio of the polyurethane backbone, OH, and S to the polymer segment(s) B ranges from about 5:95 to about 95:5; and
   (b) a dispersing agent; and
   (c) a magnetizable pigment dispersed in said copolymer.

6. A composite for magnetic recording comprising:
   (a) a substrate having a front side and a back side; and
   (b) a cured dispersion coating on at least one side comprising the cured copolymer of claim 5; a dispersing agent; and a magnetizable pigment dispersed in said cured dispersion.

* * * * *

UNITED STATES PATENT AND TRADEMARK OFFICE
CERTIFICATE OF CORRECTION

PATENT NO.: 5,134,035

DATED: July 28, 1992

INVENTOR(S): Ramesh C. Kumar et al.

It is certified that error appears in the above-identified patent and that said Letters Patent is hereby corrected as shown below:

Col. 2, line 59, replace "H" with --$H^+$--.

Col. 3, line 4, before "therewith" insert --hydroxy and sulfonate groups rather than blended--.

Col. 4, line 58, replace "95" with --5:95--.

Col. 9, lines 50-55, replace "HO" with --OH--.

Col. 18, line 56, after "polycaprolactone" insert --diol produced--.

Col. 18, line 59, after "diol" insert --,--.

Col. 18, line 66, after "triol" insert --available from Union Carbide, molecular weight about 540,--.

Col. 23, line 24, replace "where" with --wherein--.

Signed and Sealed this

Sixteenth Day of July, 1996

Attest:

BRUCE LEHMAN

Attesting Officer    Commissioner of Patents and Trademarks